United States Patent [19]
Harrison et al.

[11] Patent Number: 5,833,470
[45] Date of Patent: Nov. 10, 1998

[54] INFORMATION/ENTERTAINMENT SYSTEMS WITH USER PROMPTS

[75] Inventors: Robert G. Harrison; Robert D. Lamson, both of Seattle, Wash.

[73] Assignee: Coach Master International, Seattle, Wash.

[21] Appl. No.: 719,176

[22] Filed: Sep. 24, 1996

[51] Int. Cl.⁶ .............................. G09B 7/00; G09B 5/00; H04N 7/00

[52] U.S. Cl. ..................... 434/323; 434/307 A; 348/552

[58] Field of Search ........................... 434/307 R, 307 A, 434/308, 309, 310; 348/552, 553

[56] References Cited

U.S. PATENT DOCUMENTS 5,120,230  6/1992  Clark et al. ................................ 44/307
5,454,722  10/1995 Holland et al. ......................... 434/271

OTHER PUBLICATIONS

Panasonic Omnivision VHS Video Cassette Recorder Model PV–4459 Operating Instructions for PV–4459 manufactured Jun. 15, 1994, Jun. 1994.

*Primary Examiner*—Robert A. Hafer
*Assistant Examiner*—John Edmund Rovnak
*Attorney, Agent, or Firm*—Hughes, Multer & Schacht, P.S.

[57] ABSTRACT

Systems which have an integrated unit (or module) that allows information retrieved from an onboard information storage device to be presented in visual, audio, or visual audio form via output devices such as CRT screens and audio speakers. When the system is turned on, the disc player is checked to see if a disc has been loaded. If a disc is found, a message identifying the type of disc that has been loaded and a message prompting the user to activate a control which will cause the disc to be played are displayed on the integrated unit screen. If a disc is not found, the system user is prompted to load a disc. Once this is done and the disc is detected, the step of ascertaining the type of disc, displaying a disc type message, and prompting the user to start the disc playing are carried out.

12 Claims, 9 Drawing Sheets

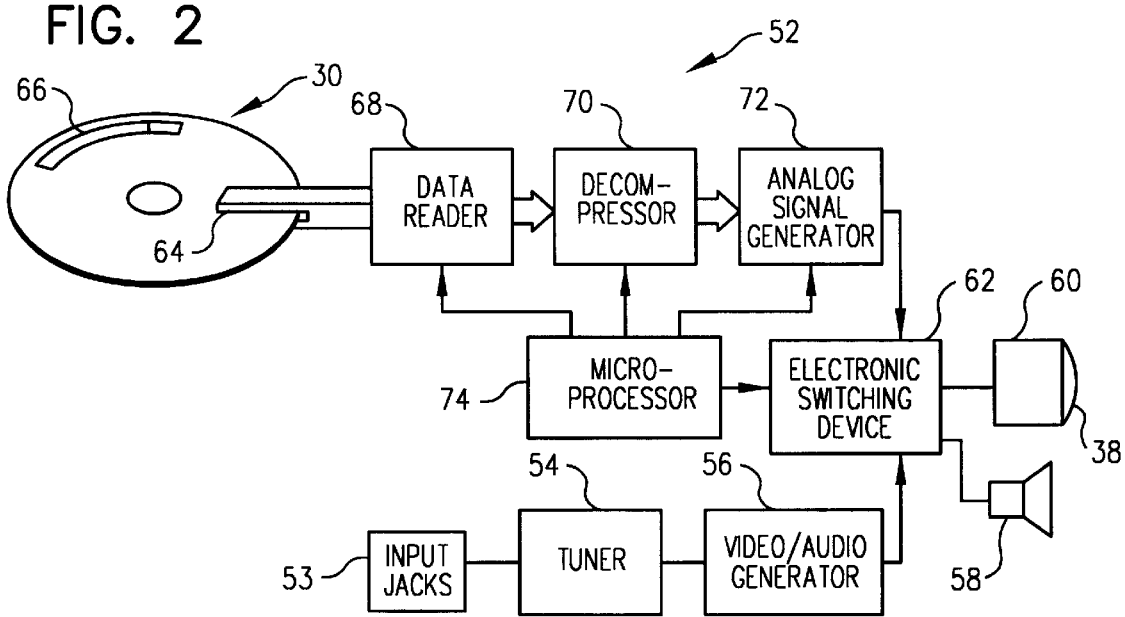
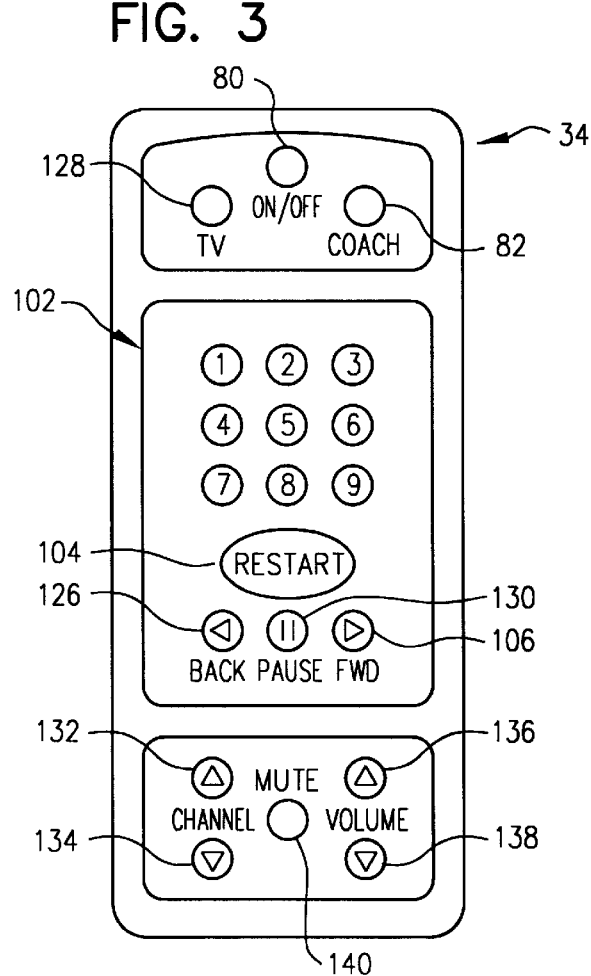
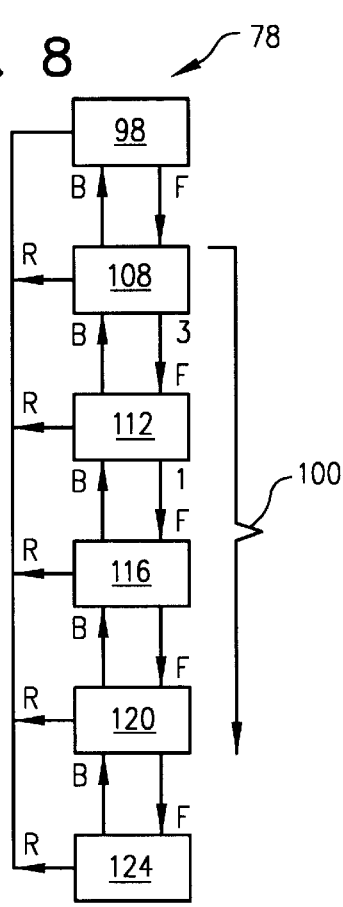

INFORMATION/ENTERTAINMENT SYSTEMS WITH USER PROMPTS

TECHNICAL FIELD OF THE INVENTION

The present invention relates to novel improved systems with the capability of displaying information retrieved from a laser readable disc in a learning (or COACH) mode of operation.

More particularly, the present invention relates to systems as described in the preceding paragraph which have the capability of displaying prompt messages designed to lead a user through the steps employed in starting up the system and in operating the system in its COACH mode of operation.

BACKGROUND OF THE INVENTION

There are now commercially available entertainment/information systems with modules (or integrated units) which combine, in a single cabinet, a television set and a player for a laser readable disc which may be an audio disc but will perhaps more typically be a laser readable disc encoded with data representing a presentation of information in an audio visual format Stored on the laser readable disc in digital form are: an introductory video which describes the operation of the system in an information retrieving and displaying (COACH) mode; a hierarchy of user-retrievable, statically displayed, multiple choice menus; and, for each of the choices in the lowest level menu employed in navigating a particular course through the hierarchy, the instructions or other information sought by the user. The selected information can be displayed statically on the screen of the integrated unit. The user-selected information may alternatively be presented in the form of video clip often as a demonstration of a technique for performing a particular task or a lesson on a particular subject. These dynamic presentations are preferably of short duration and focused on specific items of information so that the presentation can be readily assimilated by the user.

The introductory video allows a new user to easily access selected information on the very first try without training or guidance from another person and without consulting written instructions. For many, the elimination of the need to refer to written instructions is of paramount importance as they consider any more than the most rudimentary written instructions distasteful, if not something to be avoided at all costs.

A novel remote control and/or onboard controls are employed by the system user to control the integrated unit functions. Certain of the commercial products have both COACH and television viewing modes of operation. The remote unit has controls for all of the conventional television functions and a control which allows the user to switch at will between television viewing and information accessing modes of operation. Controls for the disc player may also be provided at the expense of increasing the complexity of the remote control.

In the commercially available, single mode units, the module comes up in the COACH mode when the power is turned one. Dual mode units—those with both COACH and television viewing modes of operation—default to the television viewing mode of operation when power is applied but can be switched to the COACH mode with a dedicated onboard control, with a dedicated control on the remote, or with either an onboard or remote control depending on the particular module at hand.

In any event, when the COACH mode is activated, the module or integrated unit plays the introductory, instructional video when the unit is turned or a dedicated PLAY button or the dedicated COACH button is pressed, provided that a video disc has been loaded into the disc player. If an audio disc has instead been loaded, pressing the PLAY or COACH button will cause the selections on that disc to be played.

By depressing a single, RESTART button on the remote control, the user can recycle to the beginning of the video after it has finished playing or at any time while the video is playing. This is particularly advantageous to the new user who can thereby easily play the introductory video as many times as is perceived to be necessary to assimilate information which the video presents.

A second, FWD (forward) button allows the user to skip at any point in the introductory video to the highest level menu in the menu hierarchy. Unless the FWD button is first pressed, the advance to the top level menu will automatically occur when the introductory video ends.

Once the highest level menu is reached, the user is instructed to navigate through the menu hierarchy by using numbered—①through ⑨—buttons on the remote control. Beginning with the top level menu, the user selects one of the menus available on each successively lower level and makes a choice of the items of information available from the lowest level menu in a particular string of menus. Choices of lower level menus and of items of information are numbered so that the user can make a choice by pressing the correspondingly numbered remote control button.

If the choice from the selected lowest level menu results in a video or audio selection being played (typically one lasting from 10 seconds to 8 minutes), the user is automatically returned to the menu from which the selection is made upon completion of the presentation. Alternatively, the video may automatically replay until action is taken by the system user.

If a static display of information is present on the integrated unit screen, that display will stay on the screen until taken off by the user. That is done by pressing a BACK button on the remote control unit. This returns the user to the menu from which the information was selected. The BACK button can also be employed to back the user up through the hierarchy of menus to the top level menu and from the latter to the introductory video. The user is backed up one step each time this button is pressed.

The integrated unit is preferably constructed so that, unless it is first turned off, operation in the COACH mode of operation will continue (or resume) from the point where it is interrupted if the unit is switched from COACH mode to the television mode and then returned to the COACH mode. This is another important feature of the invention from the viewpoint of convenience and user acceptance. The user is thereby relieved of the task of navigating through the introductory video and perhaps an entire hierarchy of menus to the point previously reached if he or she wishes to interrupt a search for, or the display of, information to watch television and to then return to the search or the viewing of the displayed information.

There are occasions on which a user may wish to review the introductory video after having navigated part way or all the way through the hierarchy of menus. The user can return directly to the beginning of this video from any level of operation by depressing the RESTART button on the remote control unit once. The system can also be programmed so that RESTART will return the user to the top level menu instead of the introductory video.

The numbered choices available on each of the menus in the hierarchy are preferably limited to nine. This makes it possible to select any option from a menu by pressing a single, correspondingly numbered button on the remote control. The one-button feature is thus also a significant contributor to the featured ease of operation.

SUMMARY OF THE INVENTION

There have now been invented and disclosed herein systems which are like and have all of the desirable characteristics identified above but differ in that they have additional features which make them even easier to use.

Specifically, when systems embodying the principles of the present invention are powered up (single mode units) or switched to the COACH mode of operation (dual mode systems), an initial screen is displayed on the CRT (cathode ray screen) of the module, and the disc player is interrogated to determine if a disc has been loaded into the disc player. If one has, a message describing the type of loaded disc appears on the initial screen along with a message prompting the system user to press a PLAY or COACH button in order to play the disc. If a disc is not present, a message prompting the system user to load one into the disc player appears on the initial screen. Once the operating system of the module verifies that a disc has been loaded, messages as described above which identify the type of disc and prompt the user to press a PLAY or COACH button are displayed on the initial screen.

The result of this novel modus operandi is that the system user is never frustrated when he or she presses an appropriate button but nothing happens because a disc has not been loaded into the player of the integrated unit. Furthermore, the user is made aware at the very outset of the type of disc which is loaded into the disc player, and an error in disc selection can be propitiously remedied if the wrong type of disc has been loaded.

The important objects, features, and advantages of the present invention will be apparent to the reader from the foregoing and the appended claims and as the ensuing detailed description and discussion proceeds in conjunction with the accompany drawing.

BRIEF DESCRIPTION OF THE DRAWINGS

FIG. 2 shows, in schematic form, the operating system of the integrated unit illustrated in FIG. 1;

FIG. 3 is a plan view of the remote control component of the FIG. 1 system;

FIG. 5 is a representation of a display which appears on the screen of the FIG. 1 integrated unit when the unit is turned on;

FIG. 8 shows, diagrammatically, one representative navigational chart which includes an introductory video and a hierarchy of menus that can be quickly and easily navigated by a user of the FIG. 1 system in the COACH mode of operation to reach information of interest stored on a video compact disc or other data storage device;

DETAILED DESCRIPTION OF THE INVENTION

Figure 1:
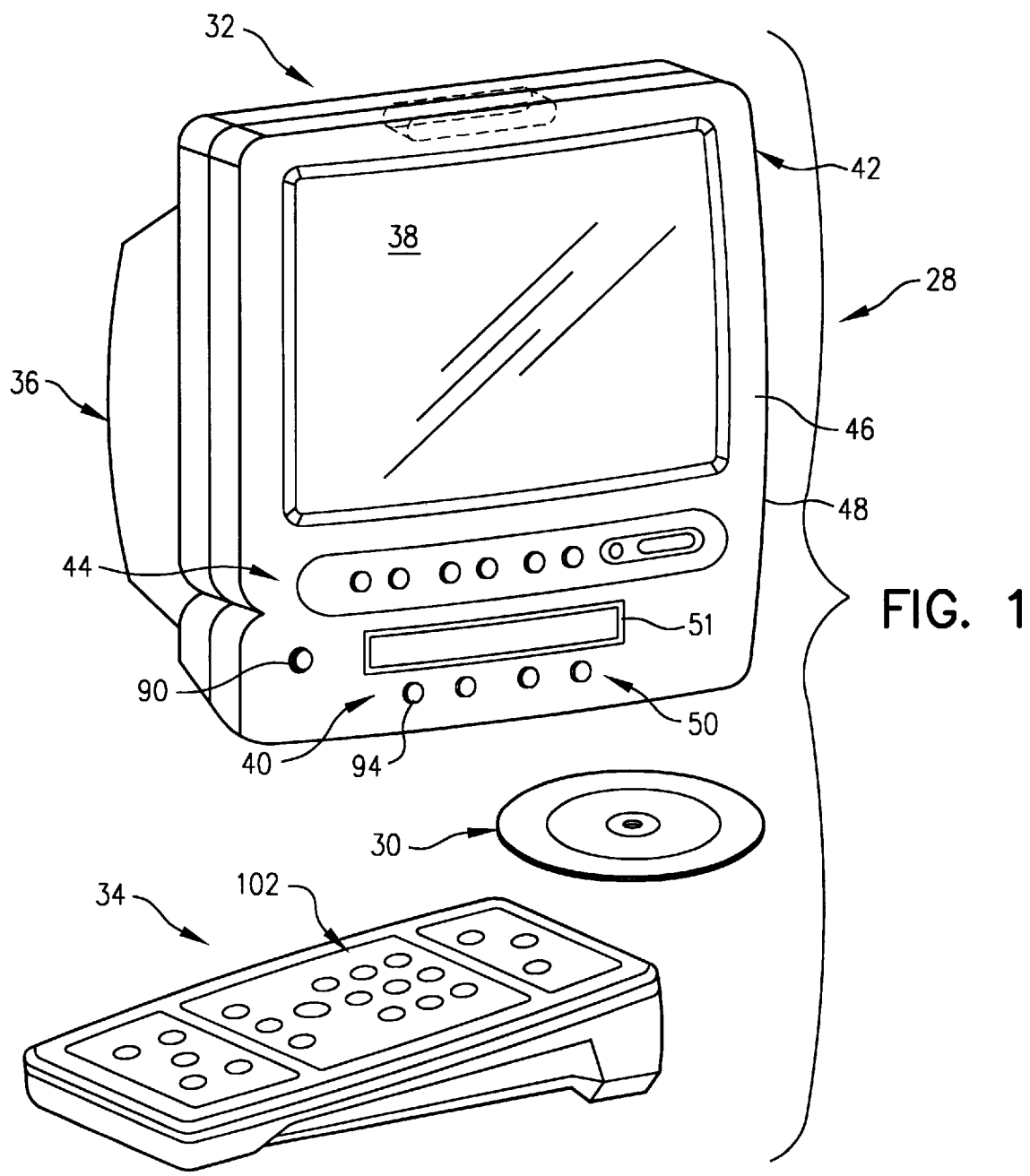
FIG. 1 depicts, pictorially, an entertainment/information system with integrated unit and remote control components and the capability of displaying prompt messages in accord with the principles of the present invention.

Referring now to the drawing, FIG. 1 depicts a system 28 designed to retrieve information from a laser readable disc 30 such as a Video 1.1 disc, a Video 2.0 disc, or a CDi disc. System 28 is so constructed that one can easily, and at any time, switch between: (a) watching television, and (b) a COACH mode of operation in which information stored on disc 30 is retrieved and presented in a visual or visual/audio format. The major components of system 28 are an integrated unit (or module) 32, a remote control 34, and the above-mentioned laser readable disc 30.

Integrated unit 32 includes a television set 36 with a CRT (cathode ray tube) screen 38 and a video compact disc player 40, both housed in the same cabinet 42. Conventional onboard controls 44 for television set 36 are located on the front panel 46 and one side panel 48 of cabinet 42, and onboard controls 50 for disc player 40 are also located on front cabinet panel 46. A conventional tray 51 is used to load a disc 30 into player 40.

The internal, operating components of integrated unit 32, depicted schematically in FIG. 2, constitute an integrated unit operating system identified by reference character 52. These components include input jacks which are collectively identified by reference character 53 and are employed to connect integrated unit 32 to a television signal source—a television antenna or cable and/or a VCR. A tuner 54 is employed by the user to select one of the available television channels to watch or the VCR channel (usually 3 or 4) at the user's location. The (off-the-air or VCR) signal is directed to a video/audio generator 56 which transforms video components of the incoming signal to a video signal which is convertible to visual images. The visual images are displayed on the CRT screen 38 of television set 36. The incoming signal typically also includes an audio component which is converted to audible sound by video/audio generator 56 and the illustrated loudspeaker 58. The video and audible signals are routed to the CRT 60 in which screen 38 is incorporated and loudspeaker 58 through an electronic switching device 62 which allows a user to choose between television reception and the COACH mode of operation.

The television set 36 and video compact disc player 40 are powered up together so that integrated unit 32 is always available for use in the COACH mode when unit 32 is turned on. When the power is turned on, the system defaults to the television viewing mode of operation.

Video compact disc player 40 has a conventional mechanism (not shown) for spinning the laser readable disc and an equally conventional laser pickup 64 for reading information stored in digital data files in the tracks 66 on discs 30 (only one of which is shown). The output from pickup 64 goes to a data reader 68, which outputs a stream of digitally compressed data (the form in which the data is stored on disc 30). The data reader is connected to a decompressor 70 for the data retrieved in the compressed format. After decompression, the data is routed to an analog signal generator 72 which converts the data to video and audio analog input signals utilizable by CRT 60 and loudspeaker 58 to generate visual images and audible sound. The operation of the data reader, the data decompressor, and the signal generator is controlled in a conventional manner by microprocessor 74, which may be a microcontroller employing Intel's Family 31 architecture.

Figure 4:
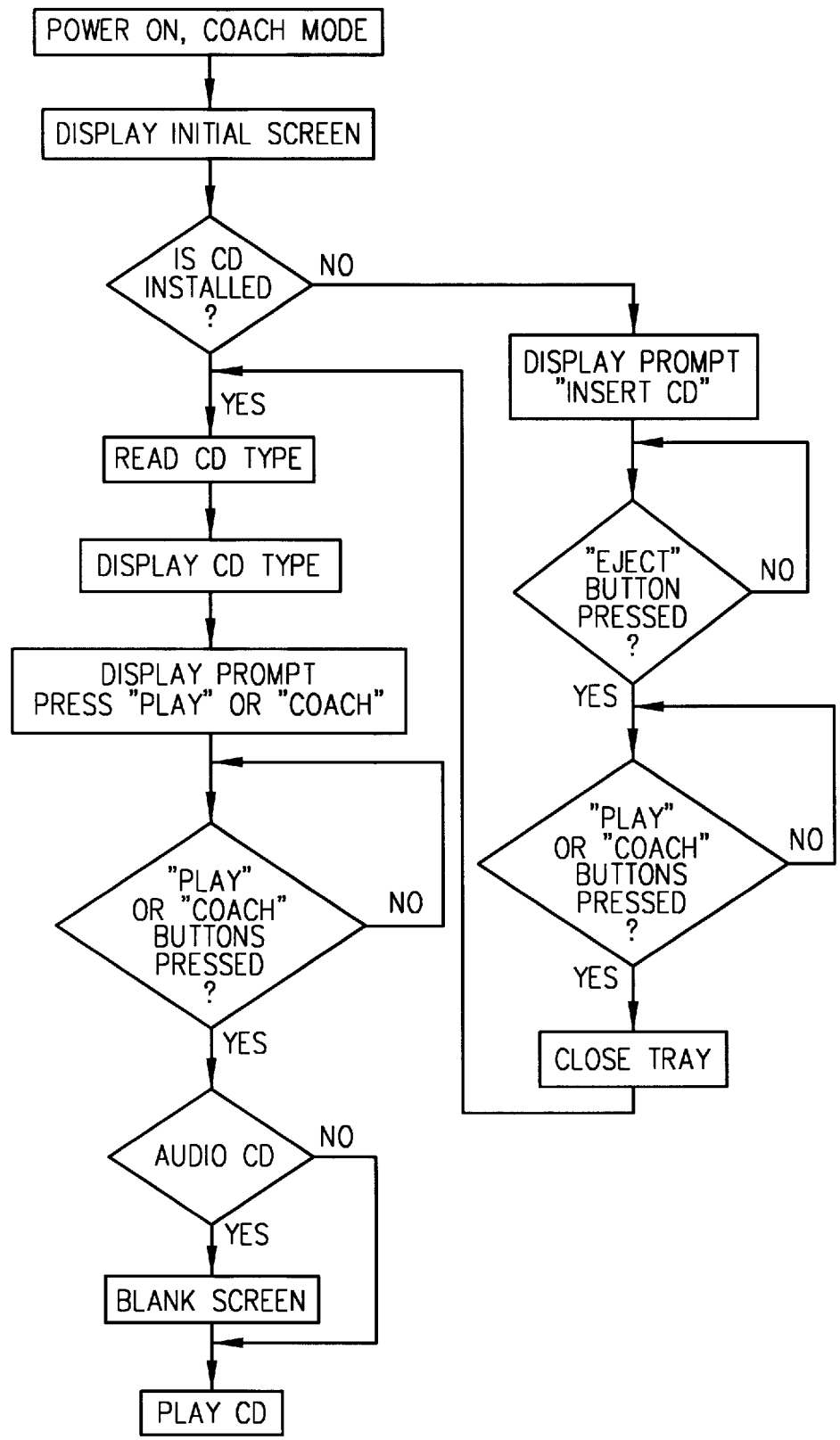
FIG. 4 is a flow diagram showing how prompt messages leading a user through the starting up of the FIG. 1 system in a COACH mode are brought up, displayed on a screen of the FIG. 1 integrated unit, and utilized to control the operation of that unit.

In the COACH or learning mode of operation of system 28, the user is guided through a hierarchical set or array of menus with the selection of an option from a bottom level menu resulting in information on the topic of interest to the user being retrieved from laser readable disc 30 and displayed on the screen 38 of integrated unit 32. The chart 78 in FIG. 4 represents a segment of an instruction set provided by data written to disc 30. Specifically, chart 78 depicts one representative course that may be navigated to retrieve information on a selected subject from compact disc 30 and to display that information on the screen 38 of integrated unit 32. In this representative example, it is assumed that the user of system 28 is seeking information on stocking a pantry with dry and bottled goods. It is also assumed that the system is being controlled entirely with remote control 34.

First, the reader is reminded that integrated unit 32 defaults to the television reception mode of operation when the on-off switch 80 of remote control 34 (see FIG. 3) is pressed to turn on the television set 36 and disc player 40 of the integrated unit. To switch to the information retrieval mode, the user presses COACH button 82.

Figure 5:
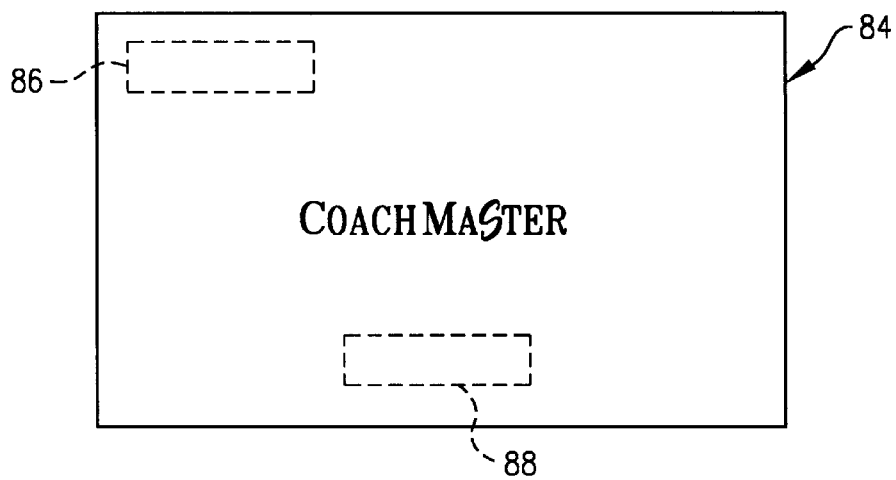

Referring to FIG. 4, powering up integrated unit 32 in the COACH mode or switching to that mode results in the initial screen 84 depicted in FIG. 5 being displayed on the CRT screen 38 of integrated unit television set 36. Next, or at the same time, disc player 40 is checked to see whether or not a laser readable disc has been installed in the tray 51 of that integrated unit component. If the answer is yes, the loaded disc is read to determine it's type. A message identifying the type of disc which has been loaded into disc player 40 is then displayed on initial screen 84 in the upper left-hand corner area identified by reference character 86. At the same time, a second message is displayed in that lower central area 88 of screen 84 identified by reference character 88. This message—PRESS PLAY OR COACH—prompts the system user to press either the PLAY button 90 on the front panel 46 of integrated unit cabinet 42 or the COACH button 82 of remote control 34. The onboard PLAY control 90 and remote control button 82 are repeatedly checked until operating system 52 determines that one of these buttons has been pressed. At that juncture, CRT screen 38 of integrated unit 32 is blanked if an audio disc has been loaded into disc player 40. If it is instead an audio visual (for example COACH disc) that has been loaded, the screen blanking step is omitted; and the disc is played.

Figure 6:
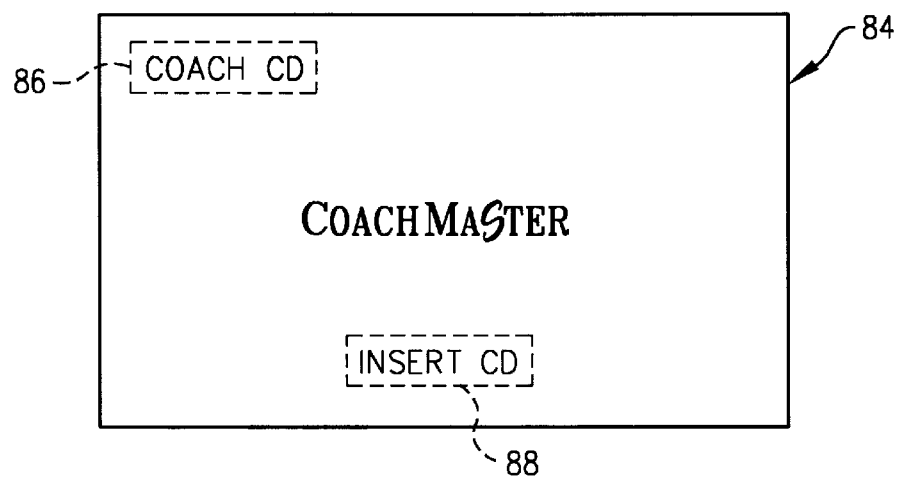
FIG. 6 shows the initial screen or display of FIG. 5 with messages which: (a) identify the type of disc that has been loaded into the disc player of the integrated unit, and (b) prompt the system user to load a disc if one is not found.
Figure 7:
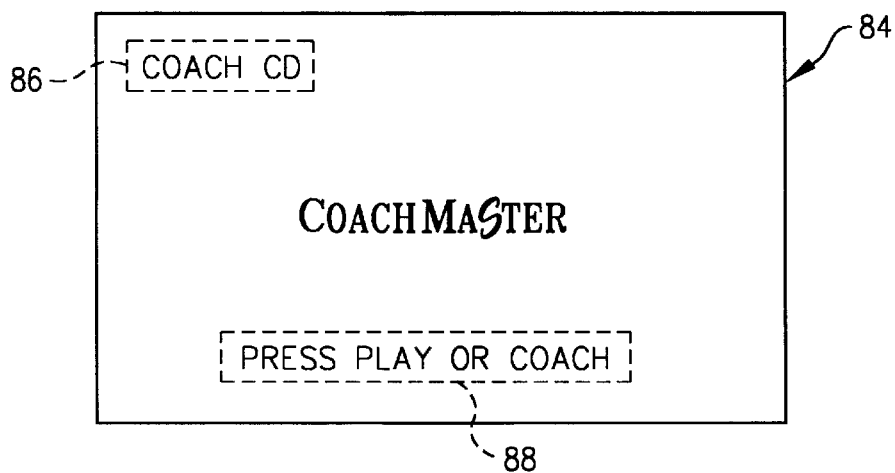
FIG. 7 is a representation of the initial display with a message which subsequently appears on the screen of the integrated unit and leads the system user to press a control which starts the integrated unit in the COACH mode of operation.

If no disc is found, the message INSERT CD is displayed in the message area 88 of initial screen 84 (see FIG. 6). Disc player 40 is then checked to see whether the EJECT button 94 on the front panel 46 of integrated unit cabinet 42 has been pressed to move disc player tray 51 into the loading position. If the answer is no, the just-described step is repeated until it is found that EJECT button 94 has been pressed. Then, the onboard disc player controls 50 and remote control 34 are checked to see whether PLAY button 90 or COACH button 82 have been pressed. If not, this step is repeated until it has been found that one of the two just-identified buttons has been pressed. At this juncture, tray 51 is retracted to load the selected disc 30 and the steps of: (a) reading and displaying the type of disc which has been loaded into player 40, (b) displaying the message prompting the system user to press PLAY button 90 or COACH button 82, (c) blanking CRT screen 38 if an audio disc has been loaded, and (d) playing the loaded disc are sequentially carried out in the manner previously described.

If an audio visual disc 30 has been loaded into disc player 40 and PLAY button 90 or COACH button 82 has been pressed, an introductory video 98 is retrieved from disc 30 and played after tray 51 reaches the closed position. The introductory video describes the operation of system 28 and tells the user how to reach information on a subject of interest. In the representative example at hand, this is done by navigating through the hierarchy of menus identified by reference character 100 in FIG. 8.

The choices at each level may be information—a static text, graphic, or text/graphic presentation or a video clip—instead of next lower level menu selections or a mixture of menu selections and informational choices. However, it may be desirable to avoid a mixed category to minimize confusion and promote ease of use.

The choices available at each level are preferably limited to nine; and these are numbered so that, at every level, a choice can be made by pressing a single, correspondingly numbered one of the buttons ① through ⑨ in remote control numerical keypad 102 (see FIG. 3). This unique feature is another one which makes system 30 easy and convenient to use and therefore acceptable to a person without technical training or inclination and with only the instruction provided by introductory video 98.

Figure 9:
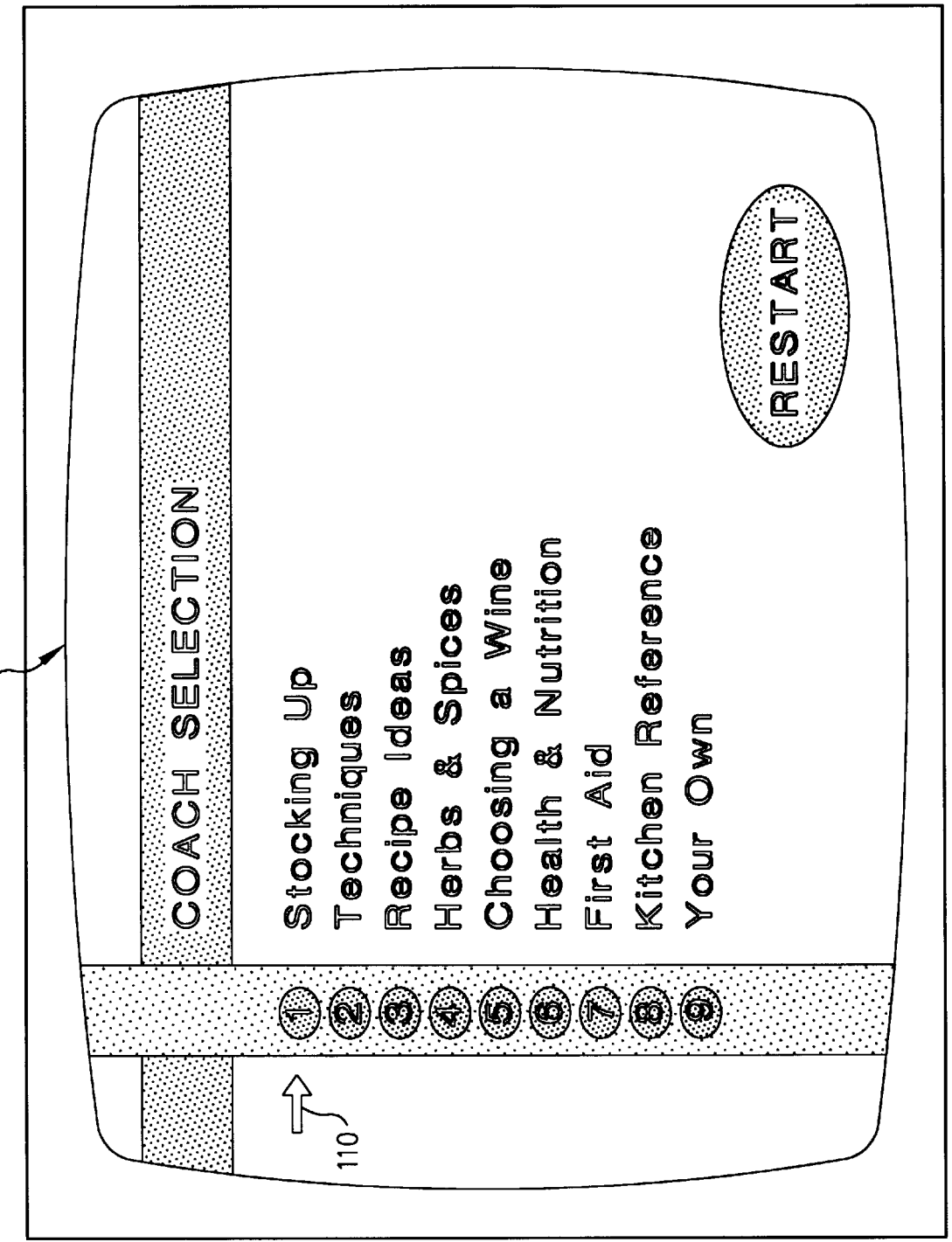
FIGS. 9–11 depict a representative set of menus which would be displayed to a user following the FIG. 7 navigation chart, in this case to reach information on dry and bottled goods with which a pantry might be stocked.
Figure 10:
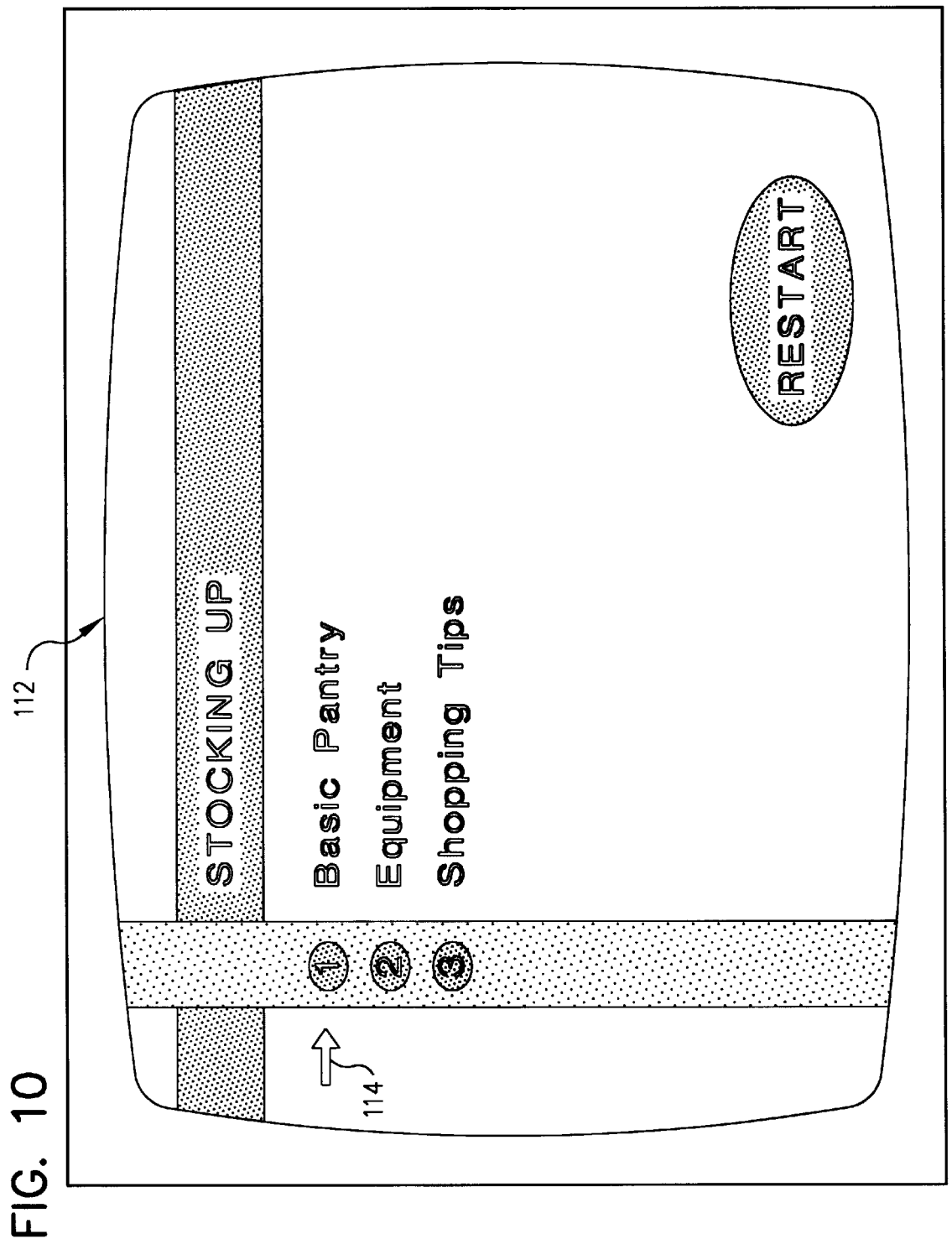
Figure 11:
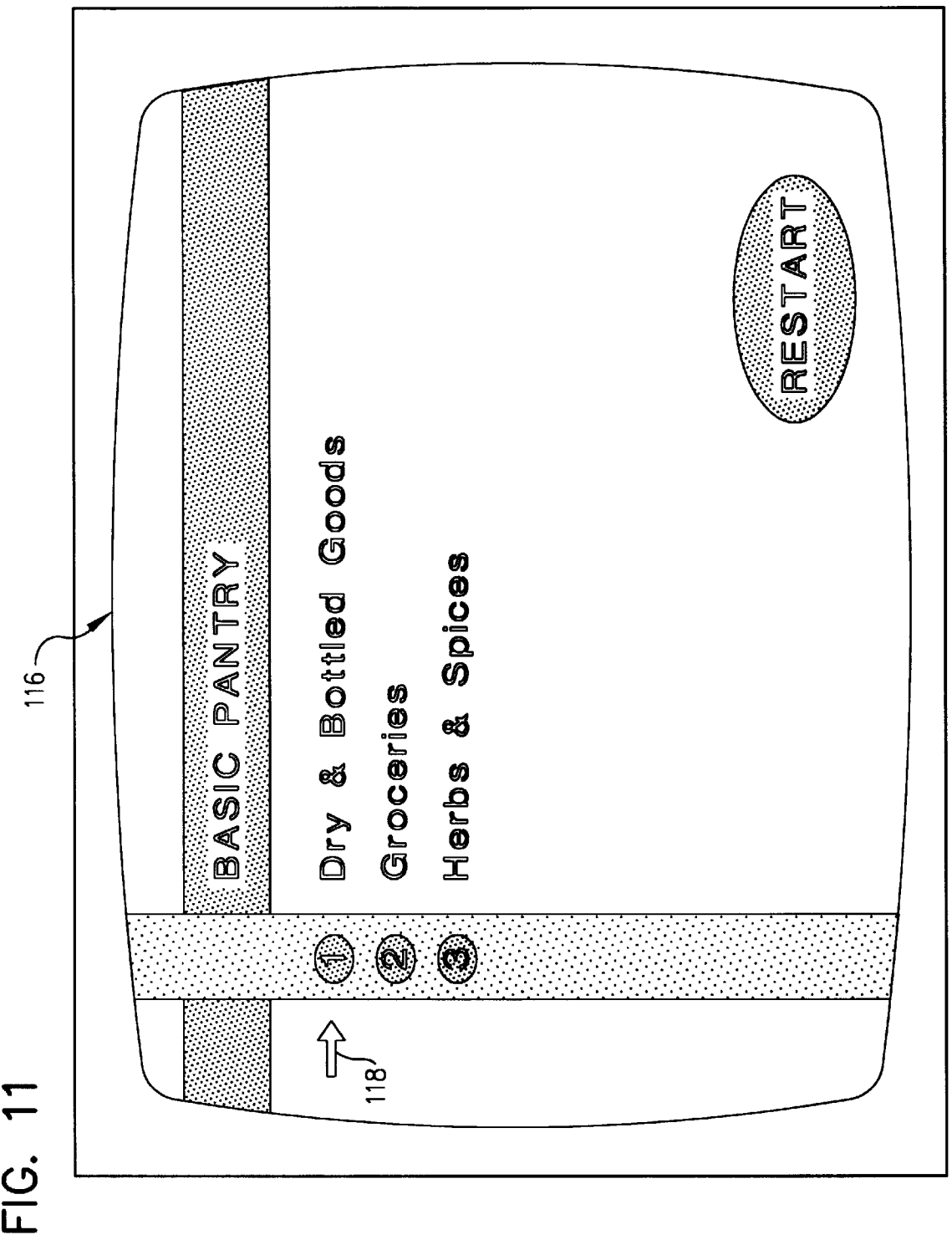

Once the introductory video 98 has been played, the user has two options. One is to press the dedicated RESTART button 104 of remote control 34. This causes the introductory video to be replayed. The second option is to press the also dedicated forward (FWD) button 106. This results in the top (100a) level menu 108 shown in FIG. 9 being displayed on screen 38. That menu has nine choices with choice one being appropriate to reach the information of interest in the representative information selection example under discussion as indicated by arrow 110. Therefore, the user presses button ① on remote control numerical keypad 102. This brings up a second (100b) level menu identified by reference character 112 in FIG. 10. This menu offers the user three choices with choice one being appropriate as indicated by arrow 114. Accordingly, the user presses button ① on keypad 102 again at this juncture. This brings up a third (100c) level menu 116 (see FIG. 11). This representative menu also offers the user three choices with choice one again being appropriate as indicated by arrow 118. The user accordingly presses keypad button ① for a third time.

Figure 12:
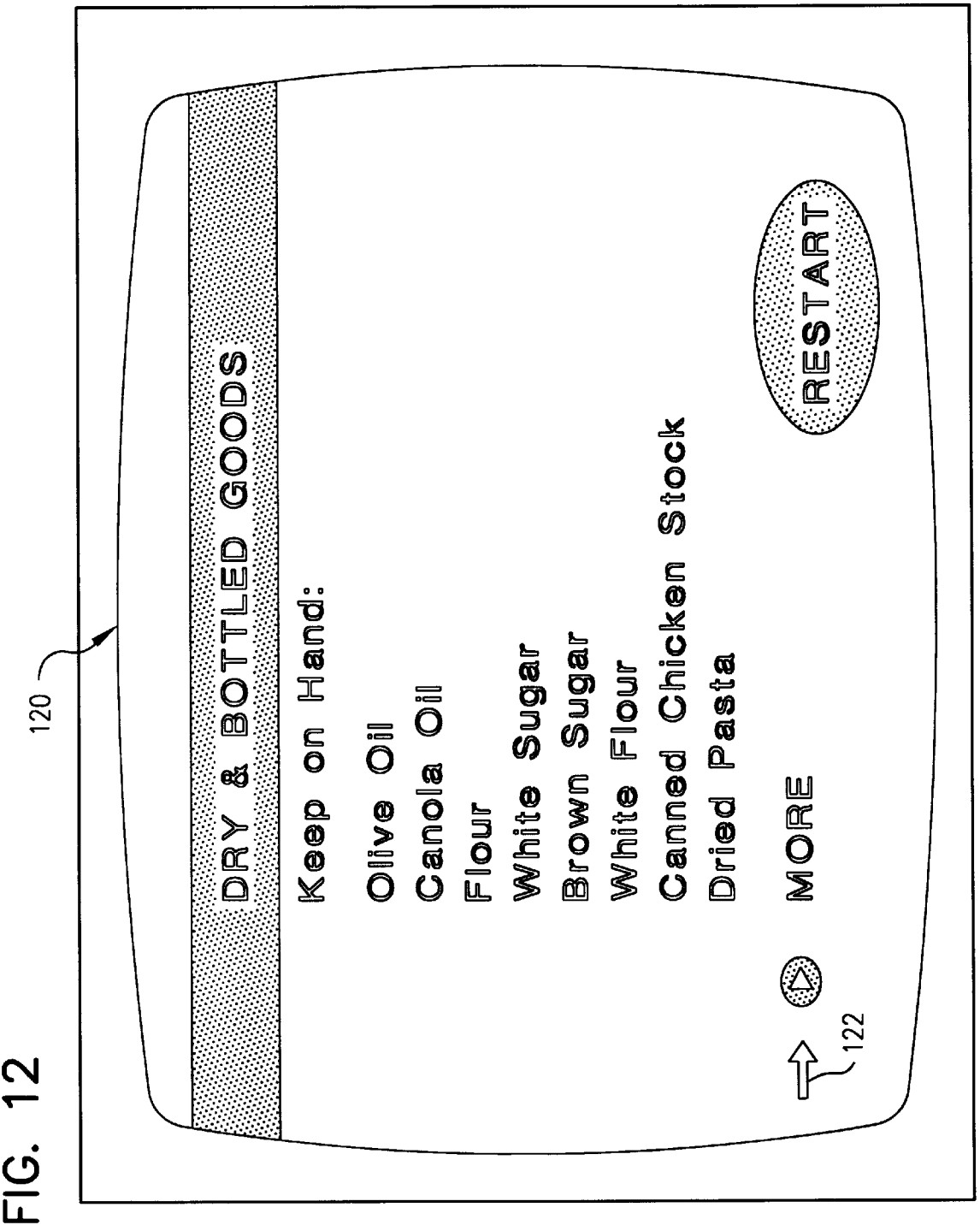
FIGS. 12 and 13 are two displays of information which are available to the system user when the user makes a choice from a lowest level menu in those hierarchically arranged menus depicted in FIG. 7.

Pressing keypad button ① for the third time retrieves and brings to the screen 38 of integrated unit 32 the information on stocking a pantry sought by the user of system 28. The screen (or image) that appears is shown in FIG. 12 and identified by reference character 120. The information sought by the user is statically displayed in textual form. It remains on screen 38 until further action is taken by the system user to remove or erase the image from the screen.

In this particular example, the information on the selected subject is too voluminous to fit on a single screen. In this and like cases, the legend MORE appears at the bottom of the screen. When that happens, the user can press remote control FWD button 106 to proceed to the next screen as suggested by arrow 122. In the current example, this brings up on screen 38 a second display shown in FIG. 13 and identified by reference character 124. Screen 124 ends with the legend END OF TEXT, indicating that all of the information on the topic selected by the system user has been retrieved from disc 30 and displayed on screen 38. This image will also remain on the screen 38 until erased by the system user.

If the presentation of information is in the form of a video clip, the user may automatically be returned to the menu from which the clip was selected when the end of the clip is reached. However, micro-processor 74 may be programmed so that selected (if not all) of the available video clips will be continuously replayed until stopped by the system user. This automatic recycle feature is important because the system user is repeatedly given needed information without any action on the user's part. This is a decided advantage in, as one example, treating a victim in need of first aid or other medical attention.

Figure 13:
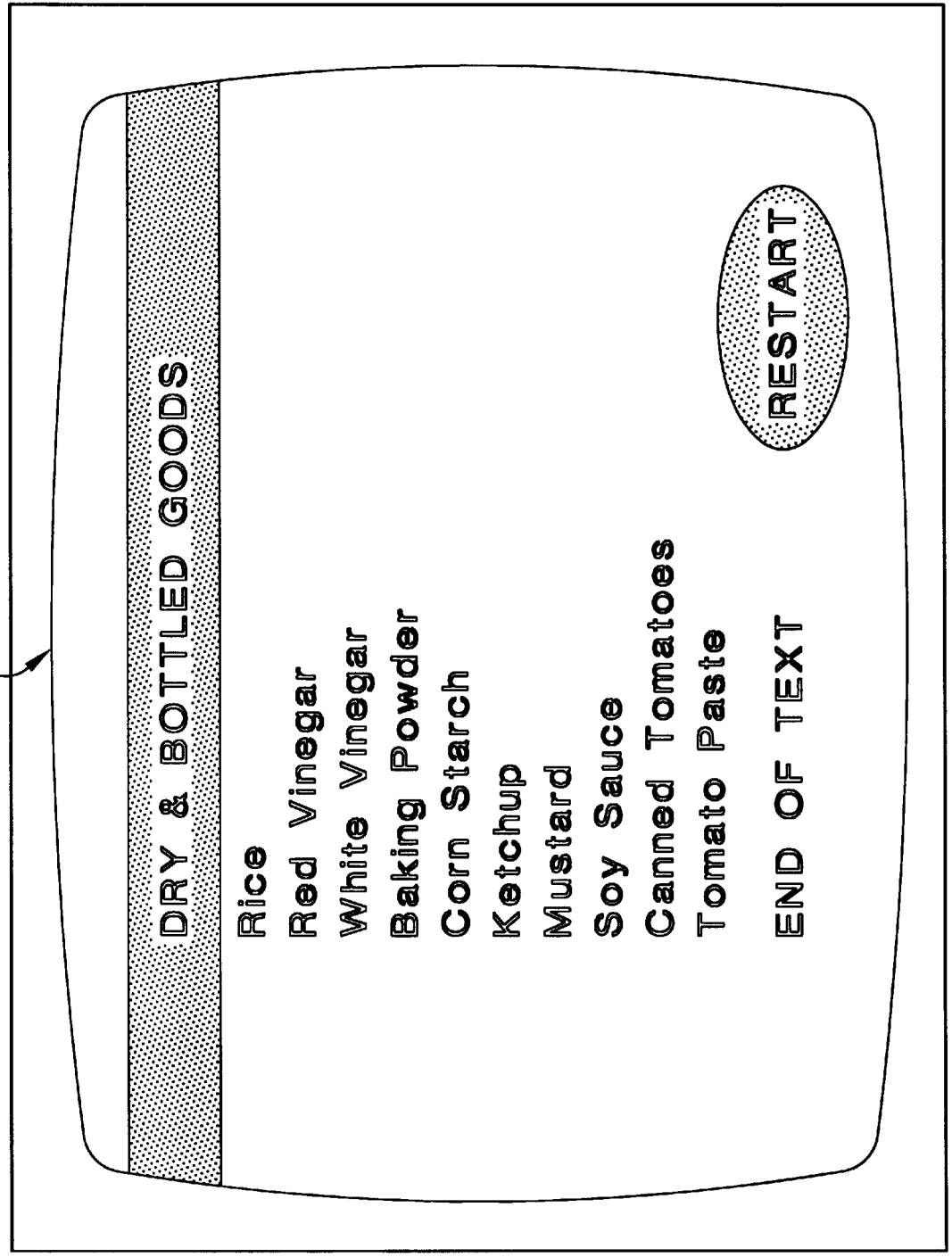

As indicated in FIG. 8, the system user can return at any point, be it from a menu, a static display of information as shown in FIGS. 12 and 13, or a video clip or other presentation to the introductory video 98. This is done by pressing remote control unit RESTART button 104. The ability to jump back to the introductory video by pressing only one button is a significant feature of the invention. It allows the system user at any time to easily and immediately rerun part or all of the introductory video if he or she perceives the need for a refreshed recollection of what is available or how to proceed in order to reach information on a subject of interest.

Another comparable, and equally important, feature of the invention is that the system user can back up one step in the step-by-step information accessing process by pressing a dedicated remote control button 126 labeled BACK. In the example under discussion, for instance, this enables the system user to back up from screen 124 to screen 120, from the latter to third level menu 116, from any menu in the hierarchy to a higher level menu, and from the highest level menu 108 to the introductory video 98. This allows the user to easily and by using only one button review the information presented on screen 38 in a preceding step, to navigate a different path through the available choices, and to return to the introductory video from the top level menu 108.

The arrangement just described is redundant to the extent that the system user can step back from top level menu 108 to introductory video 98 by pressing either BACK button 126 or RESTART button 104. This is purposeful. It eliminates the need for the system user to remember which of these buttons has to be pressed to reach the introductory video from the top level menu.

In addition to the push button controls described above, remote control 34 has a TV button 128 for selecting the television viewing mode of system operation, a PAUSE button 130 which is used to freeze operation of system 28 when the latter is operating in the COACH mode, and conventional: channel UP and DOWN, volume UP and DOWN, and mute buttons 132 . . . 140. Except as noted, these buttons are used for the usual purposes. These buttons are furthermore not part of the present invention, and will accordingly not be described in detail herein.

It is to be understood that the description of system 28 by reference to the stocking pantry example is not intended to limit the scope of the appended claims as, simply by employing an appropriate disc, information may be provided on an essentially endless variety of tasks and subjects. For example, the task at hand may be to learn a foreign language; and the encoded information may include lessons on that subject. Also, it is to be understood that the development of the principles of the present invention by reference to a representative dual—television watching and learning—mode type of integrated unit was elected for the sake of brevity and clarity, that this approach is therefore likewise not intended to limit the scope of the appended claims, and that there are other types of modules in which the principles of the present invention may advantageously be embodied. Such modules include those, described briefly above, which have only a single, COACH mode of operation.

Furthermore, it will be appreciated that many modifications may be made in the exemplary, illustrated hardware without exceeding the scope of the present invention. For example, as suggested above, the integrated unit may have onboard controls which duplicate those of the remote control, making that component an optional one.

The invention may be therefore embodied in many forms without departing from the spirit or essential characteristics of the invention. The present embodiment is therefore to be considered in all respects as illustrative and not restrictive. The scope of the invention is indicated by the appended claims rather than by the foregoing description, and all changes which come within the meaning and range of equivalency of the claims are therefore intended to be embraced therein.

What is claimed is:

1. A system which can be employed in a learning mode to obtain information on a subject or task at hand, said system comprising:

a laser readable disc encoded with data providing a hierarchical array of multiple choice menus, the data representing information on each available topic being stored on said disc in correspondence with a choice available from a menu in said hierarchical array;

a module which has a player for said laser readable disc and a viewing screen on which information can be displayed;

user-actuatable controls incorporated in said module or a remote control and operable when said system is in said learning mode for making choices from the multiple choice menus in said hierarchical array;

means operable when said system is powered up or switched to said learning mode to determine whether a laser readable disc has been loaded into said disc player and to:

if a loaded disc is found: (a) identify the type of disc and display on said screen a message identifying the type of disc, and (b) display on said screen a message prompting a system user to activate a control which will result in the laser readable disc being played; and if a disc is not found: (c) prompt said user to load a disc into said disc player, (d) then identify the type of disc and display on said screen a message identifying the type of disc, and (e) display on said screen a message prompting a system user to activate a control which will result in the laser readable disc being played.

2. A system as defined in claim 1 in which said operating means has the capability of blanking said viewing screen if it is found that a laser readable disc of the audio type has been loaded into said disc player.

3. A system as defined in claim 1 in which said module also has a second, television viewing mode.

4. A system as defined in claim 1 in which said module has:

a second, television viewing mode;
said user-actuatable controls comprising means for:
switching said system between the first, learning mode of operation and the second, television viewing mode of operation; and
returning the operation of the system automatically and without user intervention to the point at which operation of the system in said first mode is interrupted by switching said appliance from operation in that mode to operation in the television receiving mode when the system is thereafter returned to operation in the first mode by the system user.

5. A system as defined in claim 1 in which said laser readable disc is encoded with data representing an instruction set and wherein said instruction set contains a user-retrievable command which is executable with one of said user-actuatable controls and enables a user to have the information on a particular topic repeated.

6. A system as defined in claim 1 in which said laser readable disc is encoded with data representing an instruction set and in which said instruction set has user-retrievable commands which are executable by different ones of said user-actuatable controls and which enable a user to navigate directly from a presentation of information on one topic to a presentation of information on a preceding or subsequent topic.

7. A system as defined in claim 1 in which said laser readable disc is encoded with information which represents an instruction set with a user-retrievable command which is executable with one of said user-actuatable controls and which enables a user to return directly from a presentation of information on a particular topic to a display of a top level menu in a hierarchical array of menus or to an introductory video represented by data encoded on said laser readable disc.

8. A system as defined in claim 1 in which said laser readable disc is encoded with data which provides a hierarchical array of multiple choice menus and an instruction set with user-retrievable commands which are executable with different ones of said user-actuatable controls for navigating forwards and backwards through said hierarchical array and for selecting choices from said menus.

9. A system as defined in claim 1 in which said user-actuatable controls comprise a numerical keypad with multiple actuators, the choices available from the menus in said hierarchical array being numbered and so encoded that any choice can be made by activating a single actuator of said numerical keypad having the number corresponding to said choice.

10. A system as defined in claim 9 in which the numerical keypad is incorporated in the remote control of the system.

11. A system as defined in claim 1 in which the laser readable disc is encoded with data which represents a video clip, a multiple choice menu included in said hierarchical array from which the retrieval and display of said video clip can be selected, and an instruction set so coded that said menu is returned to said viewing screen after the display of said video is ended.

12. A system as defined in claim 1 in which said user-actuatable controls comprise a numerical keypad with multiple numbered actuators, the choices available from the menus in said hierarchical array having numbered choices corresponding on a one-to-one basis to the actuators of said numerical keypad.

* * * * *